UNITED STATES PATENT OFFICE.

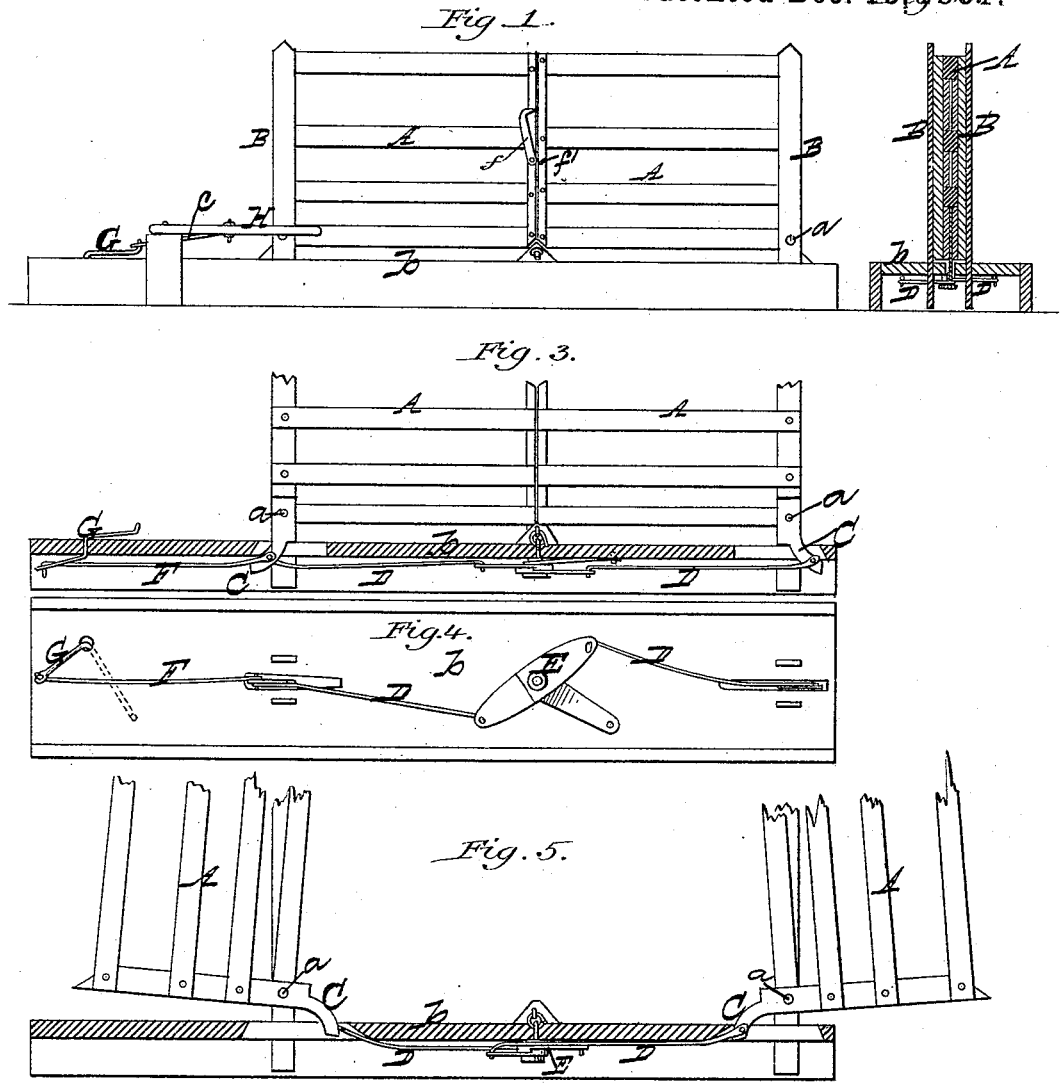

PHILLIP C. CREES, OF TUSKEEGA, IOWA.

GATE.

SPECIFICATION forming part of Letters Patent No. 250,650, dated December 13, 1881.

Application filed April 9, 1881. (Model.)

*To all whom it may concern:*

Be it known that I, PHILLIP C. CREES, of Tuskeega, in the county of Decatur and State of Iowa, have invented certain new and useful Improvements in Gates; and I do hereby declare that the following is a full, clear, and exact description of the invention, which will enable others skilled in the art to which it appertains to make and use the same, reference being had to the accompanying drawings, and to letters of reference marked thereon, which form a part of this specification, and in which—

Figure 1 is a side view of my gate. Figs. 2 and 3 are respectively a transverse section and a longitudinal section. Fig. 4 is an under side view; and Fig. 5 is also a sectional view, showing the gate open.

This invention relates to an improvement in gates of that class which open and close vertically; and it consists of two meeting gates suitably pivoted to move in a vertical plane and each in the arc of a circle, and having affixed each at its outer lower corner edge an arm curved downwardly and outwardly, which is connected to a centrally-pivoted lever, and to one of said arms is connected the operating mechanism, substantially as hereinafter more fully set forth and claimed.

In carrying out my invention I employ two gates, A, each being hung or pivoted between parallel uprights or posts B at $a$, and the two adapted to move in the arcs of circles in a vertical plane when operated, and to meet each other when closed. By holding the gates sufficiently far apart to apply the hook $f$ to the staple $f'$ they can be adjusted to permit small stock or hogs and sheep to pass in and out under them when it is desired to confine the larger animals or stock. At its outer lower corner edge each gate is provided with an arm, C, curved downwardly and outwardly, as clearly shown in Figs. 3 and 5, to secure the requisite leverage upon, and to effect with the other mechanism hereinafter described the movement of, the gate in the arc of a circle for opening and closing it. The arms C are connected by connecting-rods D to a centrally-pivoted lever, E, arranged upon the under side of the sill $b$, while to one of these arms is connected by a pitman, F, a crank-shaft, G, in turn connected by two arms, $c$, to levers H, by the movement of either one of which the gates can be opened or closed. The arms C reach down through slots in the sill $b$, which are only necessary when a solid sill is used.

I claim and desire to secure by Letters Patent—

The combination, with the gates A, adapted to move in the arcs of circles in a vertical plane, and having affixed to their lower outer corner edges outwardly and downwardly curved arms C, of the rods D, centrally-pivoted lever E, pitman F, crank-shaft G, arms $c$, and levers H, substantially as shown and described.

In testimony that I claim the foregoing as my own I affix my signature, in presence of two witnesses, this 11th day of December, A. D. 1880.

PHILLIP CHANNING CREES.

Witnesses:
JOHN W. EVERITT,
S. B. PECK.